US006877308B2

(12) United States Patent
Voelker et al.

(10) Patent No.: US 6,877,308 B2
(45) Date of Patent: Apr. 12, 2005

(54) PORTABLE COMBUSTION-ENGINED POWER TOOL AND A METHOD OF OPERATING SAME

(75) Inventors: Lothar Voelker, Sax (CH); Iwan Wolf, Chur (CH)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/295,409

(22) Filed: Nov. 15, 2002

(65) Prior Publication Data

US 2003/0097832 A1 May 29, 2003

(30) Foreign Application Priority Data

Nov. 29, 2001 (DE) ........................................ 101 58 626

(51) Int. Cl.[7] .................................................. F02C 5/00
(52) U.S. Cl. ........................................ 60/39.6; 123/299
(58) Field of Search ........................... 60/39.6; 123/299, 123/300

(56) References Cited

U.S. PATENT DOCUMENTS 6,378,288 B1 * 4/2002 Towfighi et al. ............. 60/39.6
6,439,202 B1 * 8/2002 Carroll et al. .............. 123/467
6,450,149 B1 * 9/2002 McGee ........................ 123/480
6,491,018 B1 * 12/2002 Duffy et al. ................ 123/299
6,606,974 B1 * 8/2003 Duffy et al. ................ 123/299

* cited by examiner

*Primary Examiner*—Hoang Nguyen
(74) *Attorney, Agent, or Firm*—Sidley Austin Brown & Wood, LLP

(57) ABSTRACT

A method of controlling operation of a portable, combustion-engined, power tool and including feeding fuel into the combustion chamber of the power tool, before ignition, several times one after another in accordance with an intermittent metering operational mode, and a power tool including a control device (34, 64) for controlling operation of the fuel feeding device (32, 33) of the power tool so that the feeding device (32, 33) feeds the fuel into the combustion chamber (1) several times in accordance with the intermittent metering operational mode.

16 Claims, 16 Drawing Sheets

PORTABLE COMBUSTION-ENGINED POWER TOOL AND A METHOD OF OPERATING SAME

BACKGROUND OF THE INVENTION

1. Field of the Invention

The present invention relates to a portable, combustion-engined power tool, in particular a setting tool for fastening elements, and including a combustion chamber, a device for feeding fuel into the combustion chamber to obtain therein a combustible air-fuel mixture, and an ignition device for igniting the air-fuel mixture that fills the combustion chamber. The present invention also relates to a method of controlling operation of such power tool.

2. Description of the Prior Art

In a power tool that is formed, e.g., as a nail setting combustion-engined tool, a drive is applied by a piston to a nail-like element for driving it in an object. An ignitable air-fuel gas mixture becomes available when the setting tool is pressed against the object. Upon actuation of a trigger or an actuation lever, an electrical spark is generated that ignites the air-fuel gas mixture, starting the combustion process. The chemically bound energy of the fuel is transformed into the physical energy by the combustion process. The combustion of the air-fuel gas mixture leads to increase of pressure which is transformed via the piston surface, the pressure acts upon, into a linear movement which drives the nail-like element into the object.

Thus, the drive energy for driving in a nail-like element depends from the chemically bound energy available in the combustion chamber and on its transformation in a mechanically usable thermal energy. The latter is determined by a ratio λ of a gaseous fuel to air. This ratio should always be in a region of λ=1 in all of the operational conditions of the power tool. In order to be able to use the power tool in a wide temperature region with wide variations of air density, the mass of the fuel, which is fed into the combustion chamber, should correspond to the air mass which is brought in.

In the presently available setting tool, the feeding of fuel is effected with one or more metering devices which meter a predetermined amount of a liquefied fuel and which are mechanically or electronically controlled. The amount of fuel is determined by a fixed geometry of the metering chamber and by the temperature of the liquefied fuel. Generally, the admixable fuel volume should remain substantially constant over the entire operational region. The injection of the liquid fuel into the combustion chamber is effected in one simple stroke before actuation of the power tool or before the start of the setting process, with a continuous ejection of the fuel from the metering chamber through the metering valve. A new injection begins only after the setting of the nail-like element has been completed.

Controlling the amount of the air mass brought into the combustion chamber to obtain the required ratio λ is very difficult because of the interrupted flow of air during the tool operation. Besides, the air density changes linearly with the air temperature. As a result, the fuel-air ratio λ changes even when the amount of the admixed fuel is constant. With an unfavorable fuel pressure ratios at temperatures at and below 0° C., an entire gas amount is not ejected from the metering chamber(s), which further adversely affects the fuel-air ratio λ. As a result, too little or too much of air mass is available to react with the gaseous fuel which may adversely affect the energy conversion.

Accordingly, the object of the invention is to provide a method of controlling a portable, combustion-engined tool which would insure a most favorable energy conversion at different operational parameters and/or environmental condition.

Another object of the invention is to provide a power tool in which a most favorable energy conversion can be obtained at different operational parameters of the tool and environmental conditions the power tool operates at.

SUMMARY OF THE INVENTION

These and other objects of the present invention, which will become apparent hereinafter, are achieved by providing a method of controlling operation according to which the fuel if fed into the combustion chamber several times one after another in accordance with an intermittent metering operational mode.

Injection of fuel into the combustion chamber several times permits to bring the ratio λ between the gaseous fuel and the air to or close to 1 even at unfavorable operational parameters and/or environmental conditions, which insures a best possible energy conversion.

Dependent on the operational parameters and/or operational conditions of the power tool, an intermittent metering operational mode or a basic operational mode, at which fuel is injected into the combustion chamber only once, can be selected. The selection between the intermittent metering operational mode and the basic operational mode can be effected manually or automatically. As a fuel, e.g., a fuel gas or a liquefied fuel gas can be used.

As a device for fuel admixing or fuel injection, e.g., a metering head can be used. Under normal operational conditions, i.e., at a temperature of about 20° C., the metering head is actuated manually or electro-mechanically in a single step. Upon actuation of the metering head, the fuel volume in the metering chamber is fed to the power tool combustion chamber through a metering valve. When the operational conditions change, e.g., when the temperature is noticeably below 20° C., the metering head is switched, manually or automatically, to the intermittent metering operational mode. The automatic switching can be effected by using thermal or electrical sensing elements. With the intermittent metering operational mode, the metering head or another fuel feeding device is actuated several times before each ignition i.e., the fuel volume, which fills or fill the metering chamber(s) is injected through the metering valve(s) into the combustion chamber, and then the filling of the metering chamber(s) and the injection of the fuel into the combustion chamber is repeated at least one more time before actuation of the setting tool. That is the mass of the gaseous fuel is increased in the combustion chamber until a ratio λ of fuel to air is close to 1, so that an appropriate ratio is obtained even when operational conditions deviates from the normal conditions. Thereby, a most effective energy conversion is obtained under substantially all conditions.

The feeding of the fuel gas into the combustion chamber or the combustion chamber sections can be effected by feeding a gaseous fuel gas directly into the combustion chamber or by feeding of a gas which was liquefied before injection. Upon injection of the liquefied fuel gas into the combustion chamber, the liquefied fuel gas evaporates so that gaseous fuel gas becomes available.

According to a further development of the present invention, with the intermittent metering operational mode, the length of following each other metering cycles increases form cycle to cycle. This is particularly advantageous during the injection of the liquefied fuel gas because during the first cycle, the metering valve is cooled to a significant extent due to consumption of the heat during evaporation. When the metering valve is again filled with the liquefied fuel gas, the latter cannot evaporate sufficiently rapidly due to its relatively low temperature. Therefore, the metering valve should be held open for a longer time period to provide for ejection therefrom of a predetermined amount of the fuel gas.

A power tool according to the present invention is characterized by a control device for controlling the operation of the feeding device so that the feeding device feeds the fuel into the combustion chamber several times in accordance with the intermittent metering operational cycle. For switching between the intermittent metering operational mode and the basic operational mode, there is provided a switching device which can be actuated annually or automatically, dependent on operational parameters and/or operational conditions.

According to an advantageous embodiment of the present invention, the fuel feeding device has at least one metering valve with which a gaseous fuel is fed but which, however, can be used for injection of a metered amount of a liquefied fuel gas into the combustion chamber. The metering valve permits to feed into the combustion chamber a relatively precise amount of the fuel gas. Preferably, the metering valve forms part of a displaceable metering head that is controlled by a control device, with the metering valve opening or closing in accordance with the movement of the metering head. The metering valve opens when the metering head moves in a direction toward the combustion chamber and closes when the metering valve moves away from the combustion chamber. Other directions of movement of the metering head are also possible.

According to one embodiment of the present invention, the control device includes cam plates for displacing the metering head. The cam plates displace the metering head when the power tool is pressed against an object in which a fastening element is to be driven in. In this case, the linear press-on movement is converted into the rotational movement of the cam plates which displace the metering head.

According to a further development of the present invention, the control device has at least two cam plates one of which has at least two cams while the other one has only one cam. Generally, the control device can include three cam plates, one with one cam, another with two cams, and a third one with three cams. With a plate having more than two cams, the fuel can be fed not with one interval but with several intervals. An appropriate operational mode in this case is selected by switching an appropriate cam plate into contact with the metering head.

Naturally, the metering intervals, at the intermittent metering operational mode, can be controlled by other suitable means. Not necessarily cam plates should be used. As a further means for controlling feeding intervals, electromagnets can be used for controlling opening and closing of the metering valve(s). The signals for controlling the operation of the electromagnets can be supplied by the control device.

As it has already been described, the switching between the basic operational mode and the intermittent metering operational mode is effected with the switching device. The switching can be effected manually, when the user actuates the switching device with his hand for selecting an appropriate operational mode. However, switching can also be effected by using different sensor devices which generate at least one control signal for selecting the appropriate operational mode dependent on the sensed or measured operational parameters and/or environmental conditions of the power tool with a change of a respective parameter(s) or an environmental condition(s), a corresponding control signal is communicated to the switching device for a necessary switching of the operational mode.

The novel features of the present invention, which are considered as characteristic for the invention, are set forth in the appended claims. The invention itself, however, both as to it constructions and its mode of operation, together with additional advantages and objects thereof, will be best understood from the following detailed description of preferred embodiments, when read with reference to the accompanying drawings.

DETAILED DESCRIPTION OF THE PREFERRED EMBODIMENT

Figure 1:
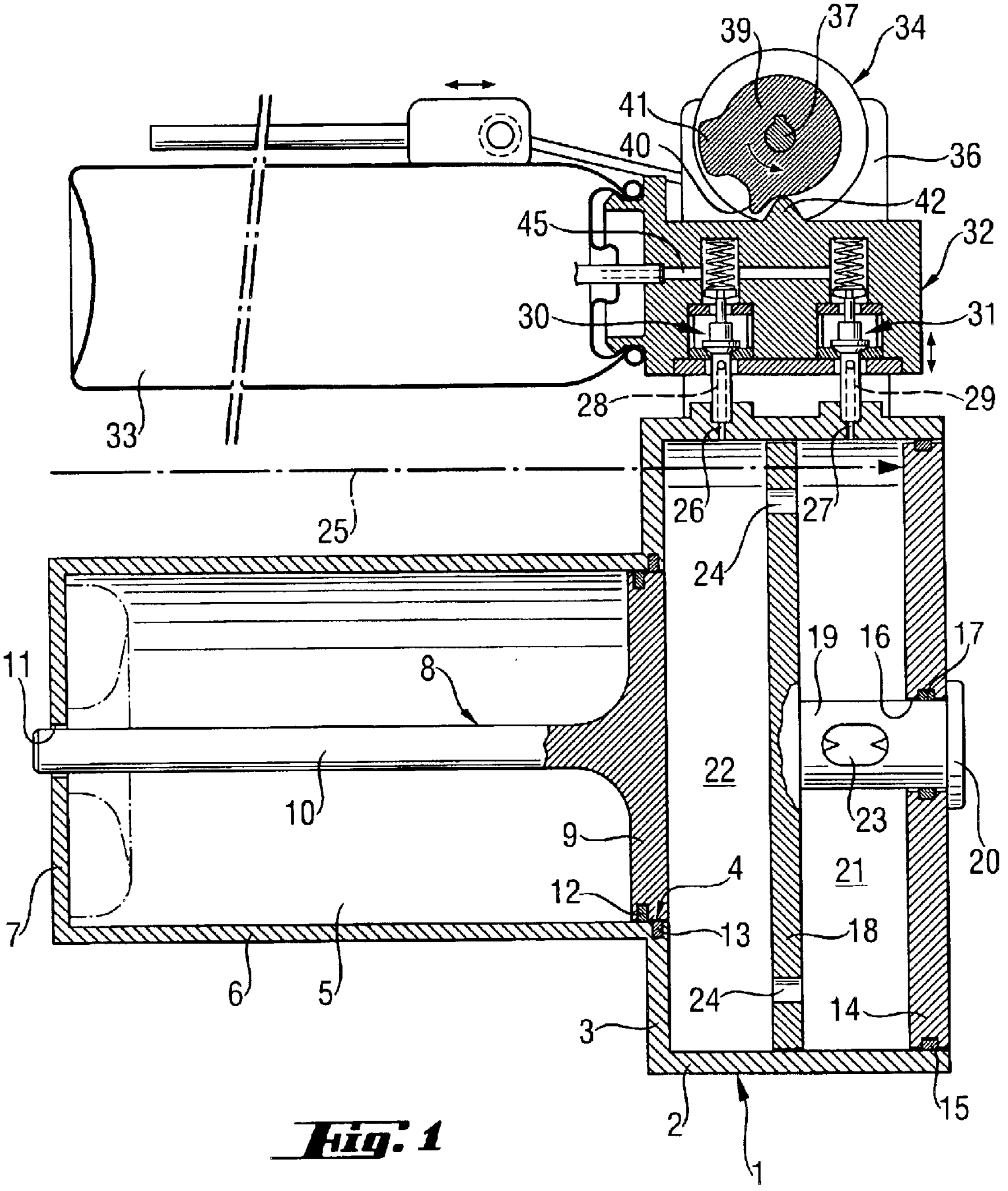
FIG. 1 shows a longitudinal cross-sectional view of a portable combustion-engined setting tool according to the present invention with an intermittent metering operational mode in an initial position of the metering head and the device for controlling the operation of the metering head.
Figure 2:
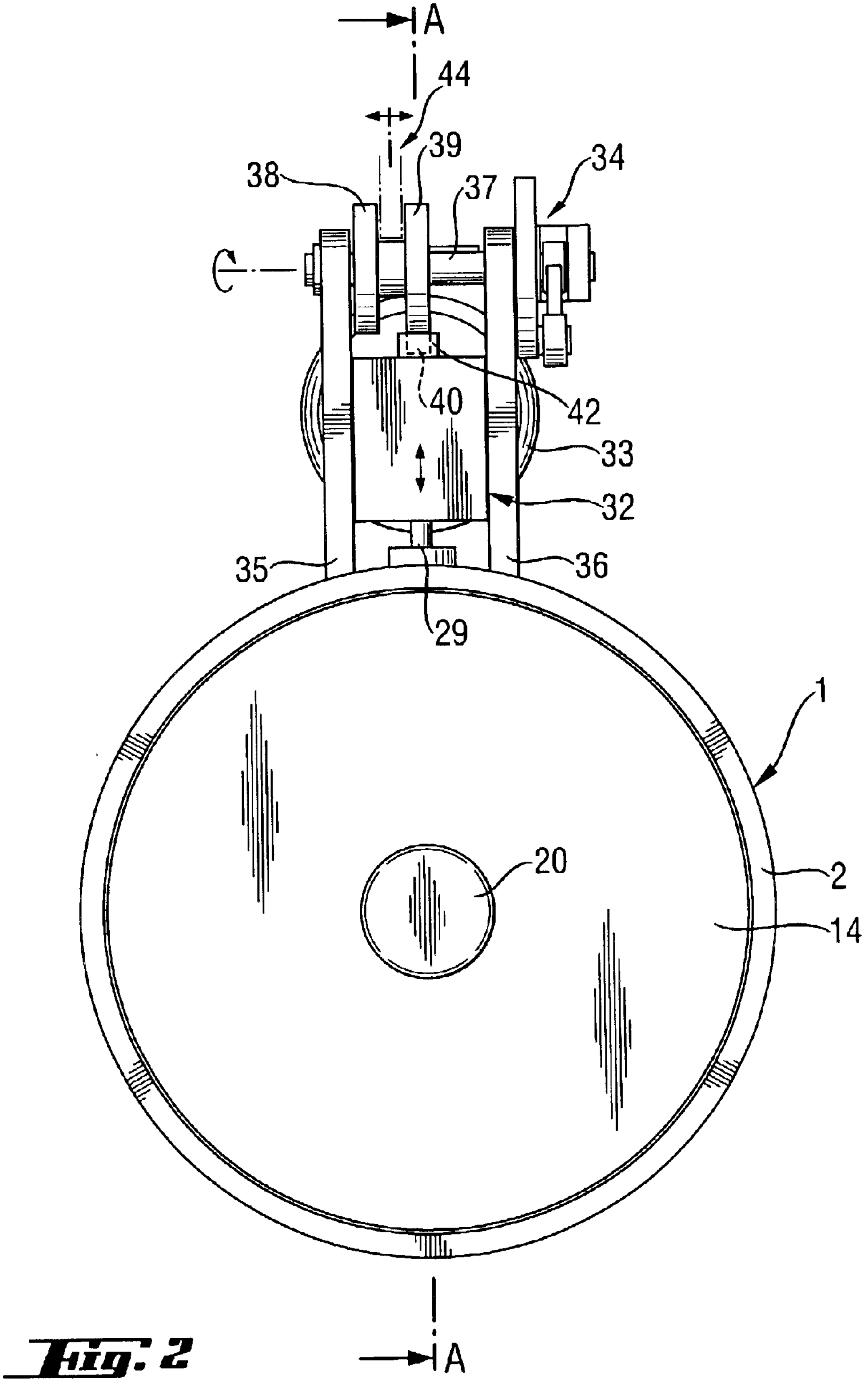
FIG. 2 shows a side view of the setting tool shown in FIG. 1 that shows a cross-sectional view along line A—A in FIG. 2.

FIG. 1 shows a cross-sectional view of a combustion-engined setting tool for fastening elements along line A—A in FIG. 2 in the region of the tool combustion chamber. The setting tool shown in FIGS. 1–2 has a combustion chamber 1 having a cylindrical side wall 2 and a bottom wall 3. In the center of the bottom wall 3, there is provided an opening 4. A guide cylinder 5, which has a cylindrical wall 6 and a bottom wall 7, adjoins the bottom wall 3 of the combustion chamber 1 in the region of the central opening 4. A piston 8 slidably displaces in the guide cylinder 5 in a longitudinal direction of the guide cylinder 5. The piston 8 is formed of a piston plate 9 adjoining the combustion chamber and a piston rod 10 that is connected with the plate 9 in the center of the plate 9 and projects partially through the opening 11 in the bottom wall 7 of the guide cylinder 5.

FIG. 1 shows the piston in its initial, rearward position when the setting tool is not operated. The piston plate 9 adjoins the bottom wall 3 of the combustion chamber 1 to a greater or lesser degree, and the piston rod 10 slightly projects past the bottom wall 7 of the guide cylinder 5. There can be provided, on the outer circumference of the piston plate 9 and/or on the inner circumference of the cylindrical wall 6 of the guide cylinder 5, sealings 12, 13, respectively. The sealings 12, 13 seal the space on opposite sides of the piston plate 9.

Within the combustion chamber 1, there is arranged a cylindrical wall 14 which further will be referred to as a movable combustion chamber wall 14. The movable combustion chamber wall 14 is displaceable in the longitudinal direction of the combustion chamber 1 and is provided, on its outer circumference, with a sealing 15 that seals the space on opposite sides of the movable combustion wall 14. The movable combustion chamber wall 14 has a central opening 16 with a sealing 17 located in the inner wall of the opening 16.

In the combustion chamber 1, a separation plate 18 is arranged between the bottom wall 3 and the movable combustion chamber wall 14. The separation plate 18 is also circular and has an outer diameter corresponding to the inner diameter of the combustion chamber 1. The separation plate 18 is connected with a cylindrical lug 19 that projects through the central opening 16 in the movable combustion chamber wall. The length of the lug 19 is several times greater than the thickness of the movable combustion chamber wall 14.

The sealing 17 closely engages the outer wall of the cylindrical lug 19. At its free end, the cylindrical lug 19 has an annular shoulder 20. The outer diameter of the shoulder 20 is larger than the inner diameter of the opening 16.

In the non-operating position of the setting tool, the separation plate 18 lies on the bottom wall 3 of the combustion chamber 1, and the movable combustion chamber wall 14 lies on the separation plate 18. Starting from this position, upon pressing the setting tool against a constructional component or an object, the movable combustion chamber wall 14 moves away from the bottom wall 3. After a certain time, the movable combustion chamber wall 14 engages the shoulder 20 of the lug 19 and entrains the separation plate 18 with it. The movable combustion chamber wall 14 is spaced from the separation plate 18 and forms therewith a so-called fore-chamber 21 that is a section of the combustion chamber 1. With further movement of the movable combustion chamber wall 14, another chamber section is formed between the separation plate 18 and the bottom wall 3 of the combustion chamber 1. This chamber section represents a main chamber 22.

In the interior of the lug 19, there is arranged an ignition device 23. When a combustible air-fuel gas mixture, which fills the fore-chamber 21 and the main chamber 22, is ignited with the ignition device 23, the air-fuel gas mixture first starts to burn in laminar fashion in the fore-chamber 21, with the laminar front spreading with a relatively low speed in a direction toward through-openings 24 formed in the separation plate 18. The laminar flame front displaces the uncombusted air-fuel gas mixture in front of it, with the uncombusted air-fuel gas mixture flowing through the openings 24 into the main chamber 22 and generating, in the main chamber 22, turbulence and pre-compression. When the flame front reaches the openings 24, the flame, penetrates into the main chamber 22 in form of flame jets which generate a further turbulence in the main chamber 22. The turbulent air-fuel gas mixture in the main chamber 22 is ignited over the entire surface of the flame jets. The air-fuel gas mixture burns now with high speed which results in sharp increase of the efficiency of combustion.

The generated pressure impacts the piston 8 which moves with high speed in a direction toward the bottom wall 7 of the guide cylinder 5 forcing the air out of the guide cylinder 5 through openings formed in the cylindrical wall 6 (not shown). After a setting process has been completed or after completion of the combustion of the air-fuel gas mixture, the piston 8 return to its initial position due to the thermal feedback which results from cooling of flue gases that remain in the combustion chamber 1 and in the guide cylinder 5 behind the piston 8. The combustion chamber 1 remains sealed until the piston 8 returns in its initial position. After the piston 8 returns into its initial position, the return plate 18 and the movable combustion chamber wall 14 return to their initial position adjacent to the bottom wall 3 of the combustion chamber 1 by spring forces. The flue gases are evacuated through outlet valves (not shown) provided in the bottom wall 3, and the setting cycle ends.

As it has already been discussed for driving a fastening element into an object, the setting tool is pressed with its tip against the object by being pushed toward the object. The linear displacement of the respective elements of the setting tool is used for displacing the movable combustion chamber 14 wall away from the bottom wall 3 in order to expand the fore-chamber 21 and the main chamber 22. The direction of the displacement fore is shown in FIG. 1 with an arrow 25. The combustion chamber wall 14 is displaced with appropriately arranged push-rods (not shown in detail).

Shortly before the complete expansion of the fore-chamber 21 and the main chamber 22, a predetermined amount of fuel gas is fed in each of the fore-chamber 21 and the main chamber 22. In the discussed embodiment, a liquefied fuel gas is separately injected into the fore-chamber 21 and the main chamber 22. Below, the injection of the liquified fuel gas into the fore-chamber 21 and the main chamber 22 will be described in detail.

As shown in FIG. 1, two radial, axially spaced from one another, through-openings 26, 27 are formed in the cylindrical wall 2 of the combustion chamber 1. Two feeding channels 28, 29 of respective metering valves 30, 31 project into the through-openings 26, 27, respectively. The metering valves 30, 31 are provided in a metering head 32. Liquified fuel gas is fed to the metering valves 30, 31 from a flask 33. The metering valves 30, 31 inject the predetermined amount of the liquified fuel gas through the feeding channels 28, 29 into the fore-and main chambers 21, 22 when the metering head 32 is pressed against the cylindrical wall 2 which results in a forward movement of the feeding channels 28, 29 which, in turn, leads to opening of the preferring valves 30, 31. To provide for opening of the metering valves 30, 31 when the feeding changes 28, 29 project further into the openings 26, 27, the openings 26, 27 taper inward, forming stops for the feeding channels 28, 29.

The displacement of the metering head 32 toward the cylindrical wall 2 of the combustion chamber 1 is controlled by control device 34 which is shown in the drawings.

The control device 34 has two support members, 35, 36 which are secured to the outer circumference of the cylindrical wall 2 of the combustion chamber 1. A drive axle 37 is rotatably supported between the two support members 35, 36. Two, spaced from each other, cam plates 38, 39 are supported on the drive axle 37. The cam plate 39, which is shown in FIG. 1, has two cams 40, 41 which project from the circumference of the cam plate 39. The cams 40, 41 are displaced against adjusting nose 42 provided on the rear side of the metering head 32, i.e., on the side of the metering head 32 remote from the combustion chamber 1. The other cam plate 38, which is shown in FIGS. 6–7, has only one cam 43 projecting from its circumference and engageable with the adjusting nose 42. The two cam plates 38, 39 are displaced in the longitudinal direction of the axle 37 by a switching device 44, whereby, alternatively, cams 40, 41 and the cam 43 are aligned with the adjusting nose 42.

When the setting tool is pressed against an object into which a fastening element is to be driven in, the movable combustion chamber wall 14 is displaced in the direction of arrow 25 by drive rods (not shown). Upon displacement of the combustion chamber wall 14, the drive axle 37 begins to rotate in a counterclockwise direction, as shown in FIG. 1. The rotation of the drive axle 37 provides for rotation of the cam plates 38, 39. With the rotation of the cam plates 38, 39. With the rotation of the cam plate 39 in the counterclockwise direction, first, the cam 40 impacts the adjusting nose 42, and then the cam 41 impacts the adjusting nose 42. In both cases, the metering head 32 is displaced in the direction toward the combustion chamber 1, which leads to a two-times actuation of the metering valves 30, 31.

In the condition shown in FIG. 1, both metering valves 30, 31 are filled with the liquified fuel gas but still remain closed. When the cam 40 impacts the adjusting nose 42, the metering head 32, together with the metering valves 30, 31 moves in the direction toward the combustion chamber 1, and the metering valves 30, 31 open. Upon openings of the metering valves 30, 31, a predetermined amount of the liquified fuel gas is injected in each of the fore chamber 21 and the main chamber 22. The cam 40 has, in the circumferential direction of the cam plate 39, a relatively small length. Therefore, the corresponding injection process is rather short. After the injection, the metering head 32, together with the metering valves 30, 31, moves away from the combustion chamber. The metering valves 30, 31 close and are again filled with the liquified gas. Meanwhile, the cam 41 impacts the adjusting nose 42, and against the metering head 42, together with the metering valves 30, 31, moves in the direction toward the combustion chamber 1. Because the length of the cam 41, in the circumferential direction of the cam plate 39, is greater than that of the cam 40, the metering head 32 is pressed against the cylindrical wall 2 of the combustion chamber 1 for a longer time. As a result, the metering valves 30, 31 are likewise open for a longer time, resulting in additional injection of the liquified fuel gas into the fore-chamber 21 and the main chamber 22. Only after the conclusion of the second injection of the liquified fuel gas, the fore-chamber 21 and the main chamber 22 completely expand, and the displacement of the movable combustion chamber wall 14 away from the bottom wall 3 stops. Now, an ignition can be initiated by the ignition device 23. The above-described operational mode represents an intermittent metering operational mode according to which before each ignition process, the fuel gas is fed into the combustion chamber 1 several times. In principle, it is possible to effect feeding of the fuel gas into the combustion chamber 1 more than two times by increasing a number of cams carried by the cam plate.

However, with the switching device 44, the cam plates 38, 39 can be so displaced on the axle 37 that the cam plate 38 is brought into contact with the adjusting nose 42 upon rotation of the axle 37. Because the cam plate 38 has only one cam 43 projecting from its circumference (FIGS. 6 and 7), before each ignition process, the fuel gas is injected into the combustion chamber 1 only once. In this case, a so-called basic operational mode is effected. Which operational mode is selected, the intermittent or basic, is left to a setting tool operator who appropriately actuates the switching device. Naturally, the selection of the operational mode can be effected automatically, dependent on environmental conditions and operational parameters of the setting tool.

Figure 3A:
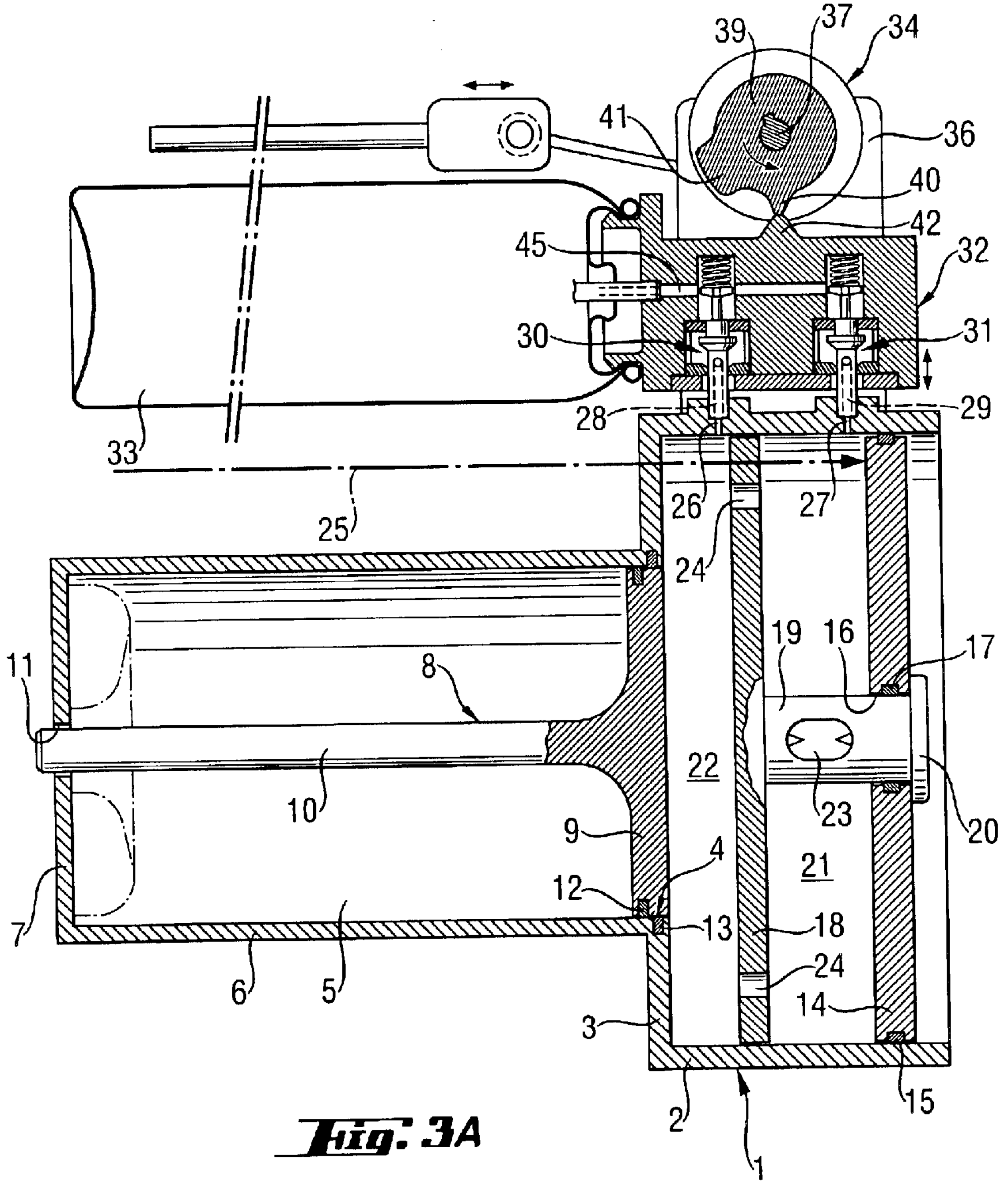
FIG. 3A shows a view similar to that of FIG. 1 but in another position of the metering head and the metering head-controlling device.
Figure 3B:
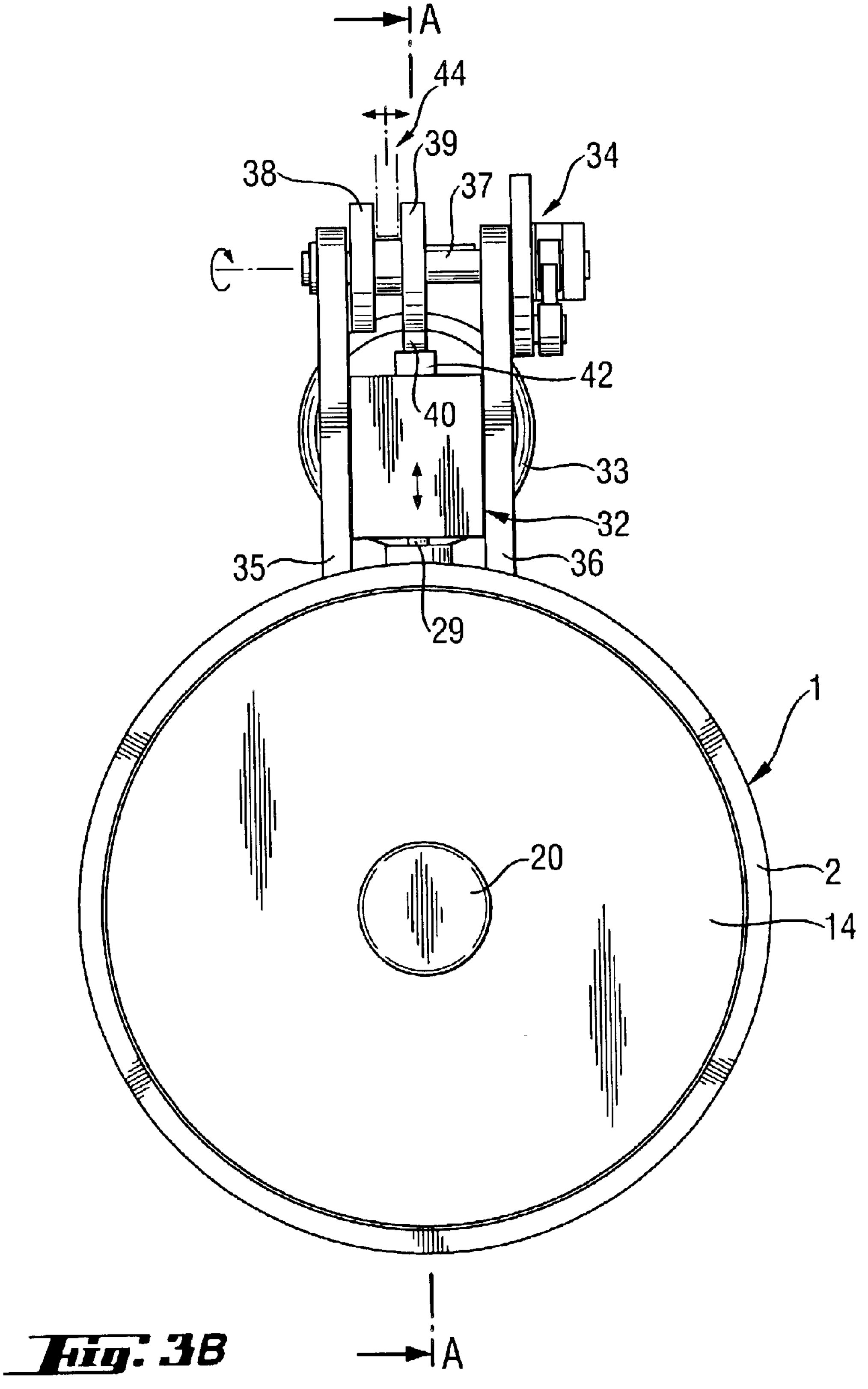
FIG. 3B shows a side view of the setting tool as shown in FIG. 3A.
Figure 4A:
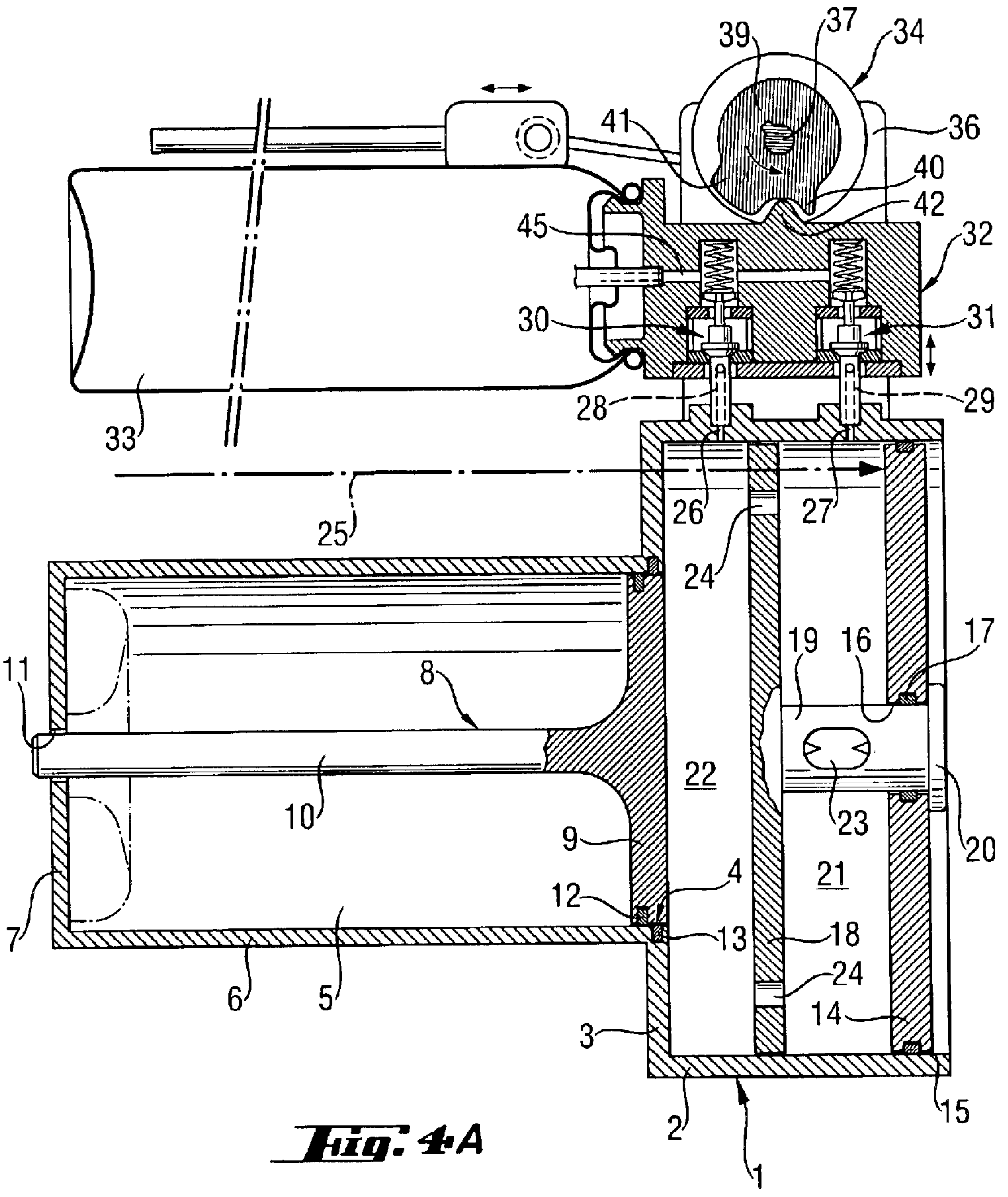
FIG. 4A shows a view similar to that of FIG. 1 but in a further position of the metering head and the metering head-controlling device.
Figure 4B:
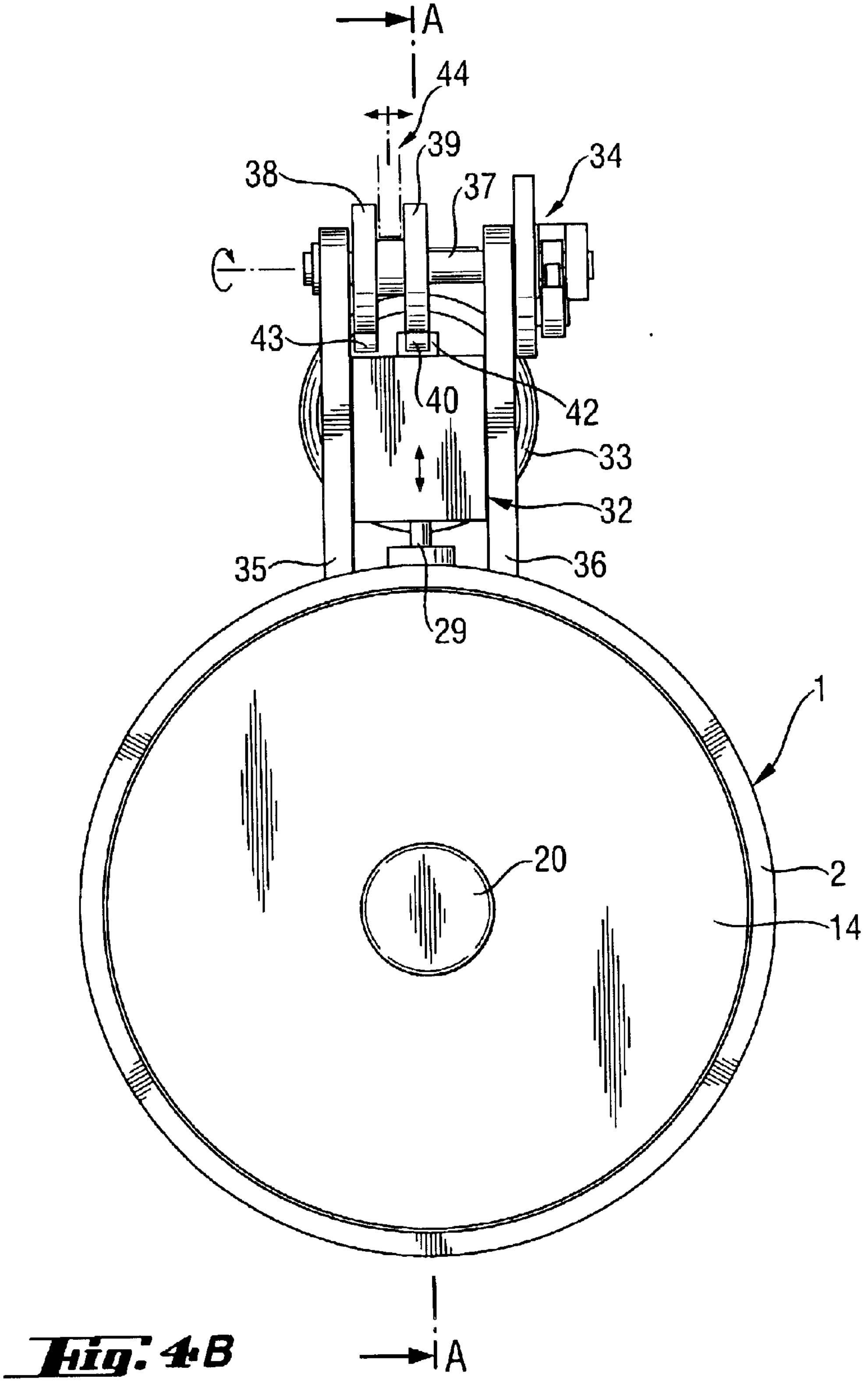
FIG. 4B shows a side view of the setting tool as shown in FIG. 4A.

FIGS. 3A/B–5A/B show a cycle of the intermittent metering operational mode for a case when the cam plate 39 is provided with two cams 40, 41, i.e., with two injections for each ignition process. In FIGS. 3A–3B, the cam 40 process the adjusting nose 42 and, thereby, the metering head 32 downward, so that the liquified fuel gas is injected from the metering valves 30, 31 into the fore-chamber 21 and the main chamber 22, respectively, for the first time. FIGS. 4A–4B show a condition in which the outlets of the metering valves 30, 31 are closed again. The adjusting nose 42 is not actuated, and the metering head 32 occupies its initial position. At that time, the metering valves 30, 31 are again filled with the liquified fuel gas.

Figure 5A:
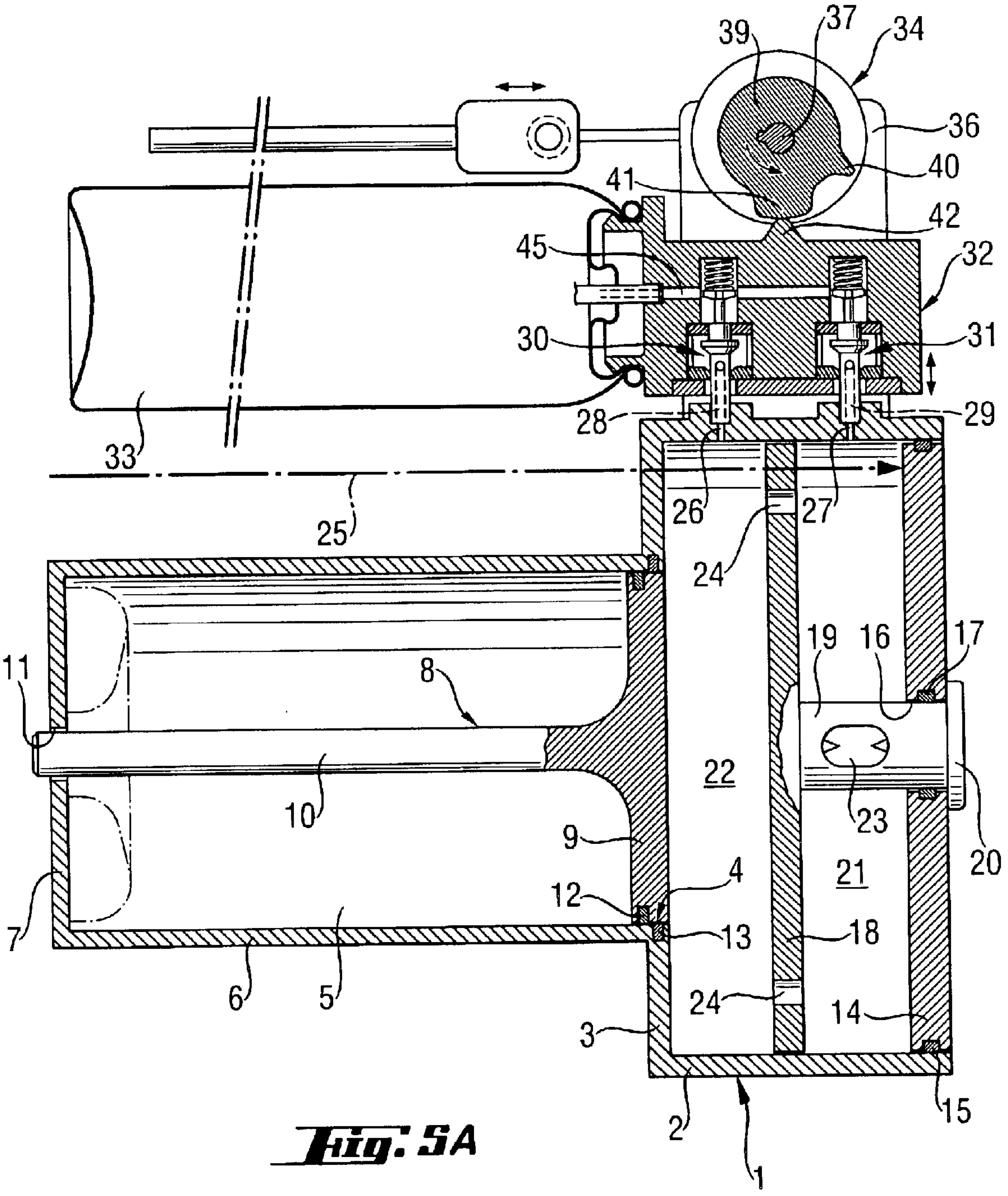
FIG. 5A shows a view similar to that of FIG. 1 but in a still further position of the metering head and the metering head-controlling device.
Figure 5B:
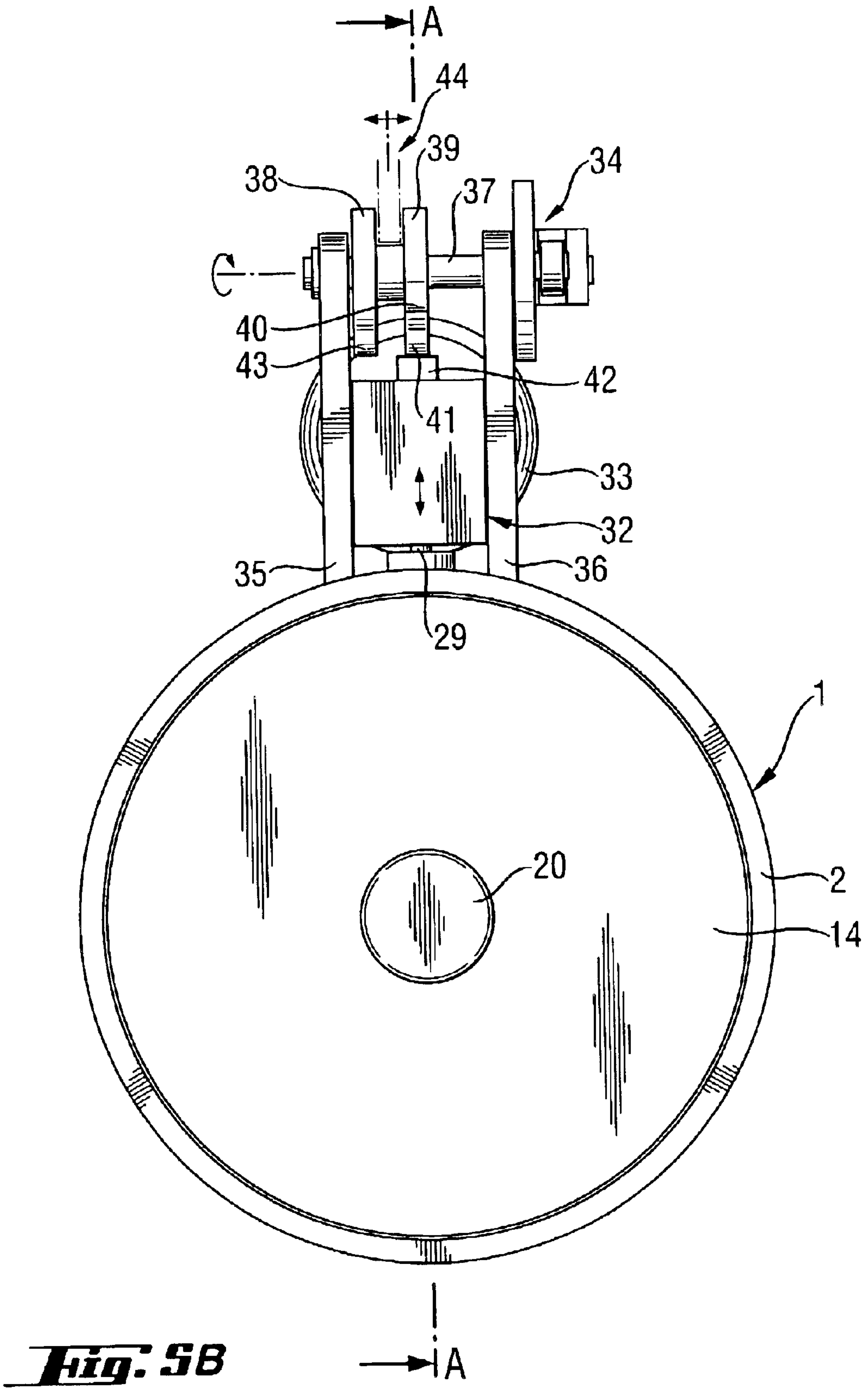
FIG. 5B shows a side view of the setting tool as shown in FIG. 5A.

FIGS. 5A–5B show a condition in which after a further rotation of the cam plate 39 is counterclockwise direction, the second cam 41 impacts or engages the adjusting nose 42. The metering head 32 is again displaced in the direction toward the combustion chamber 1. The metering valves 30, 31 open again, and the liquified fuel gas is injected into the fore-chamber 21 and the main chamber 22 for a second time. Then ignition takes place.

Figure 6A:
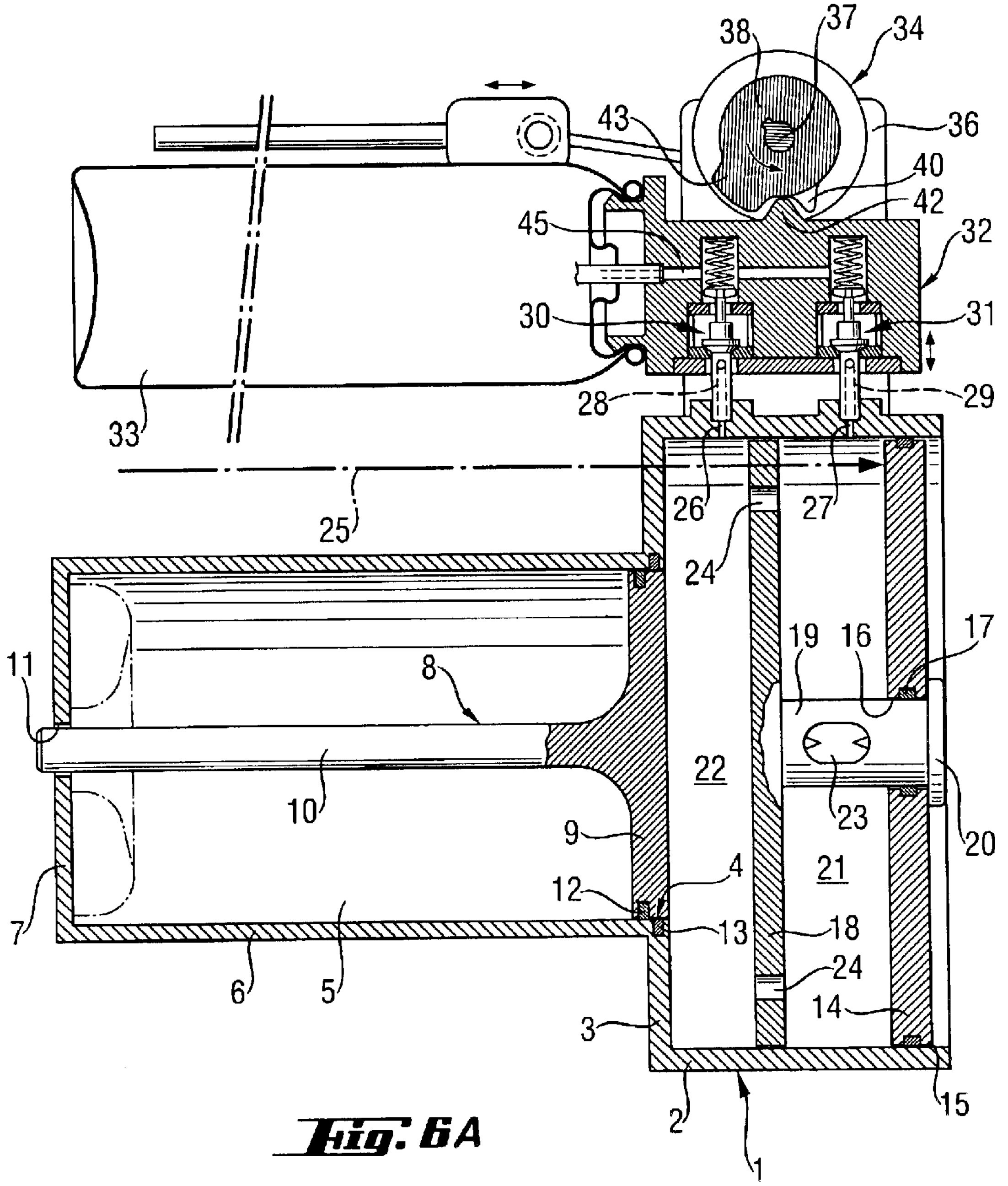
FIG. 6A show a longitudinal cross-sectional view of a portable combustion-engine setting tool according to the present invention with a basic operational mode in an initial position of the metering head and the device for controlling the operation of the metering head.
Figure 6B:
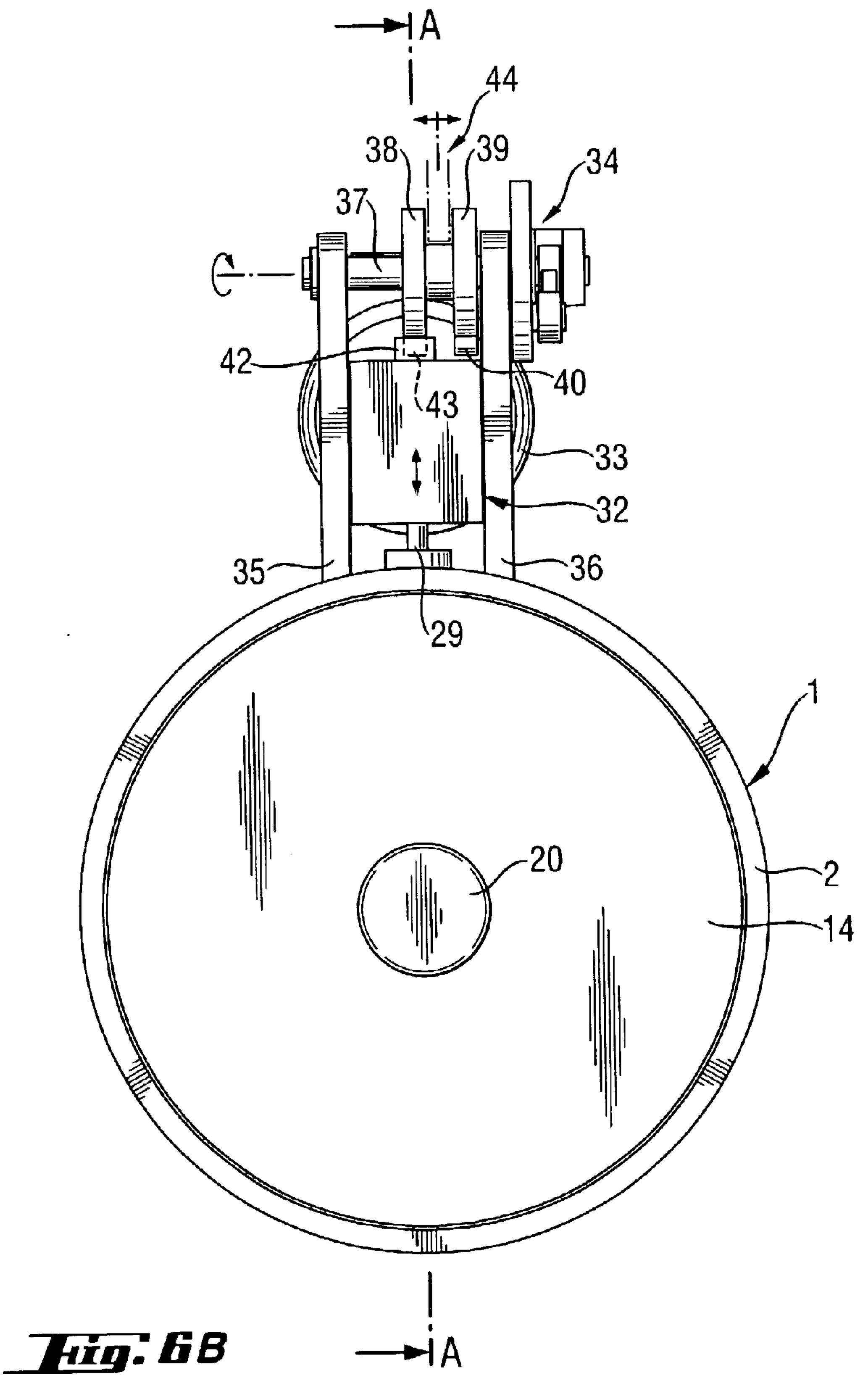
FIG. 6B shows a side view of the setting tool shown in FIG. 6A that shows a cross-sectional view along line A—A in FIG. 6B.
Figure 7A:
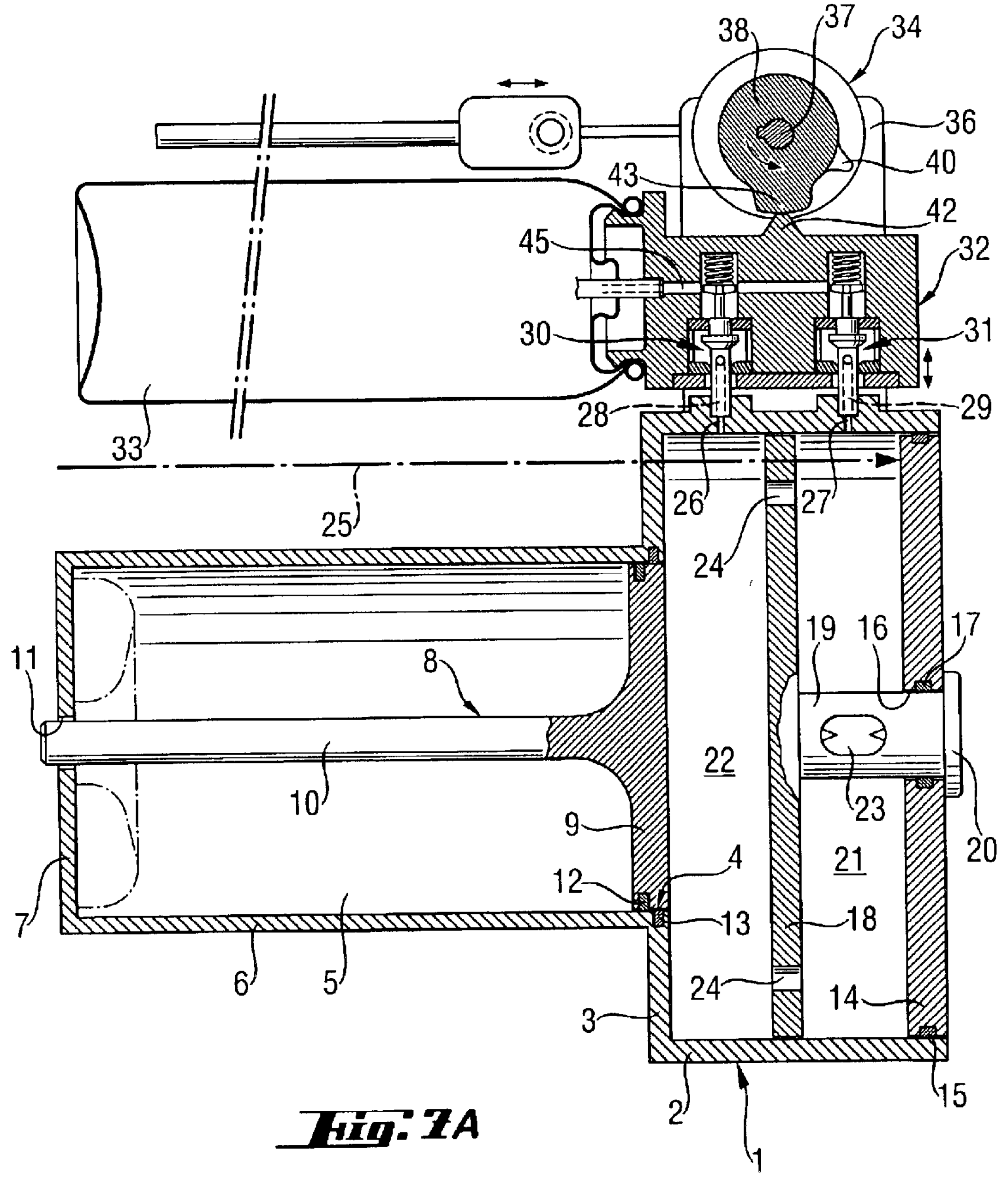
FIG. 7A shows a view similar to that of FIG. 6A but in a different position of the metering head and the metering head-controlling device.
Figure 7B:
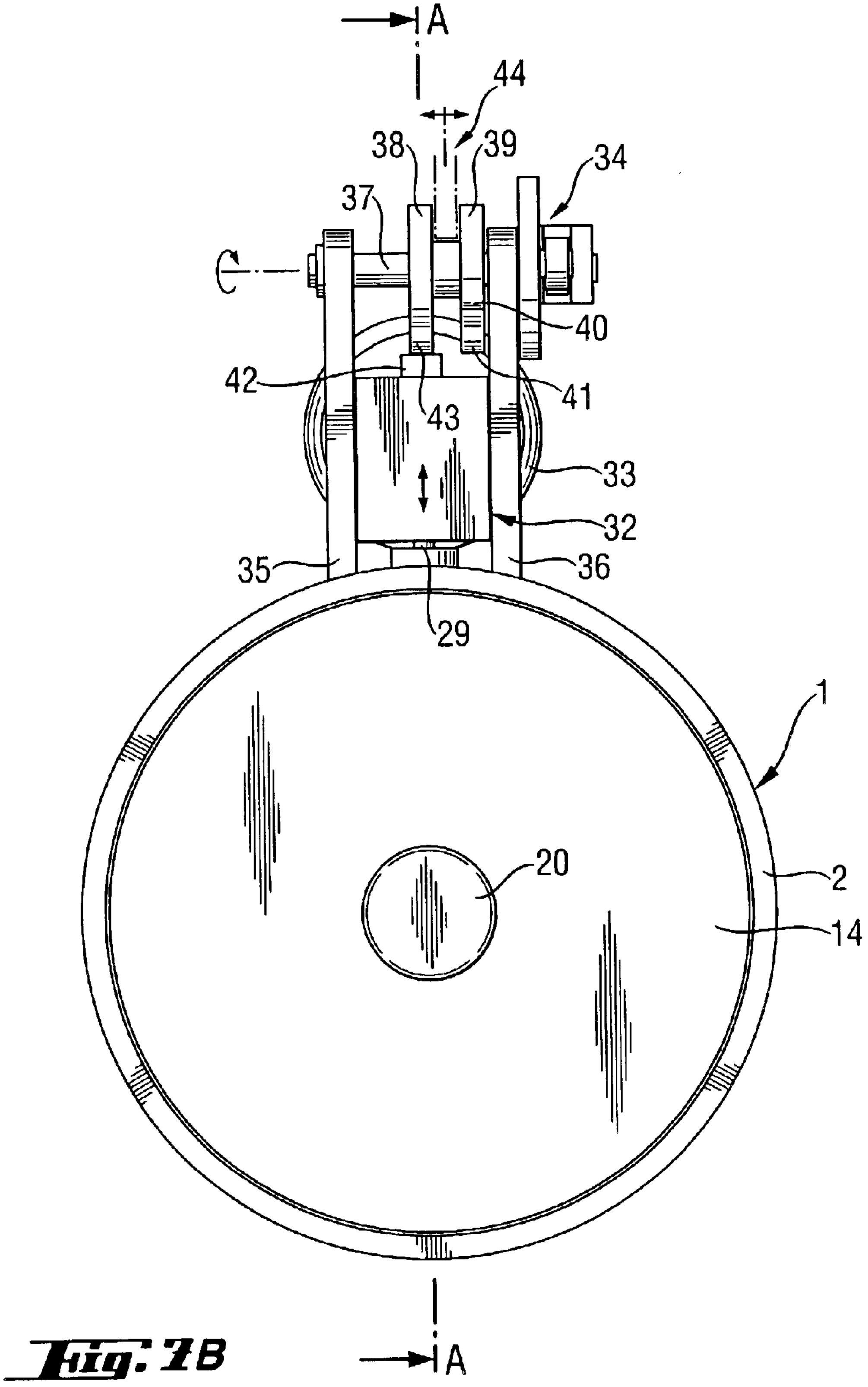
FIG. 7B shows a side view of the setting tool shown in FIG. 7A.

FIGS. 6A–7A/B show an operational cycle of a basic operational mode. In FIGS. 6A–6B, the adjusting nose 42 is not yet actuated, and the metering head 32 occupies its initial position. The metering valves 30, 31 are filled with the liquified fuel gas from the flask 33. After rotation or the cam plate 38 counterclockwise, the condition shown in FIGS. 7A–7B is reached. A single cam 43 of the cam plate 38 presses the adjusting nose 42, displacing the metering head 32 in the direction toward the combustion chamber 1. Both metering valves 30, 31 open, and a predetermined amount of the liquified fuel gas is injected into the fore-chamber 21 and the main chamber 22. Then, the ignition process takes place.

Figure 8:
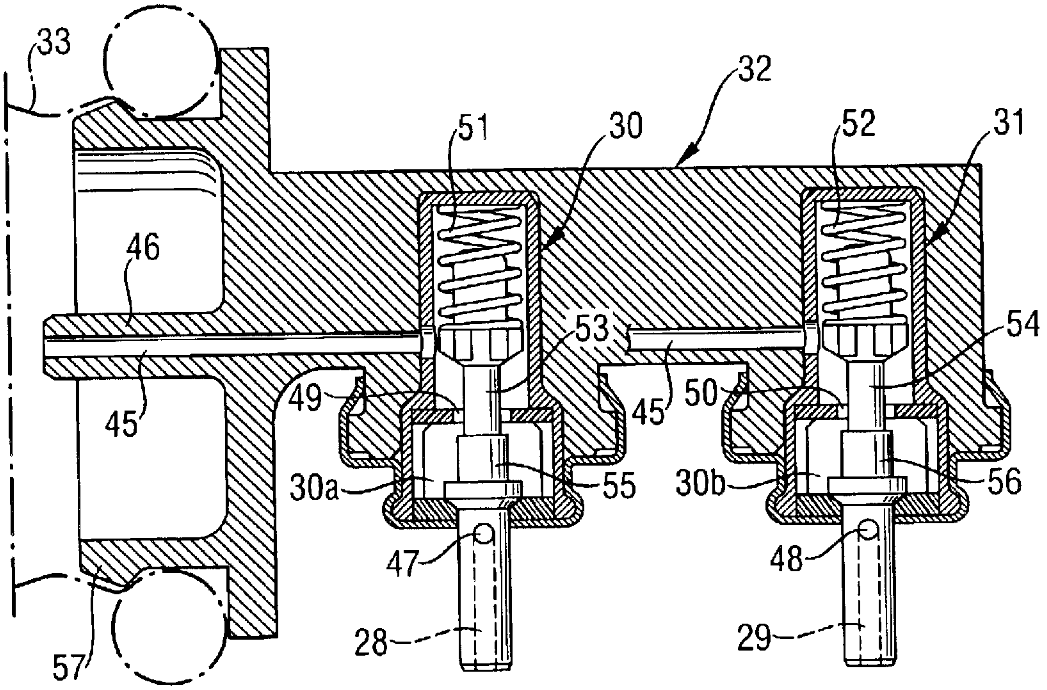
FIG. 8 shows a cross-sectional view of a metering head used in the setting device according to the present invention.

The construction of the metering valves 30, 31 which is shown in FIGS. 1 through 7B, is basically known; however, the used metering valve will be briefly described below, for completeness sake, with reference to FIG. 8. A channel 45 connects the metering chambers 30*a*, 30*b* of the metering valves 30, 31 with a hollow pin 46 of the metering head 32, and the metering chambers 30*a*, 30*b* are filled with the liquified fuel gas when the outlets 47, 48 are not located within the metering chambers 30*a*, 30*b*, i.e., when the metering valves 30, 31 are closed. In this case, the liquified fuel gas is not delivered to the feeding channels 28, 29. Rather, the liquified fuel gas flows from the flask 33 through the channel 45 and through the inlets 49, 50 into the metering chambers 30*a*, 30*b*. Thereby, metering of a predetermined amount of the liquified fuel gas takes place. The compression springs 51, 52, which are supported on bottoms of the valves 30, 31, respectively, bias respective spools 53, 54 into a position in which the outlets 47, 48 are located outside of the respective chambers 30*a*, 30*b*, i.e., into a position in which the metering valves 30, 31 are closed.

When the metering head 32 is displaced toward the combustion chamber 1, the outlets 28, 29 are displaced into the interior of the respective chambers 30*a*, 30*b*, i.e., against the biasing fore of the compression springs 51, 52, respectively. With the outlets 28, 29 being located in the respective metering chambers 30*a*, 30*b*, and the liquified fuel gas which fills the respective metering chambers 30*a*, 30*b*, flows through the outlets 47, 48 into respective feeding channels 28, 29. Simultaneously, the inlets 49, 50 become closed by corresponding enlargements 55, 56 of the respective valve spools 53, 54. Upon release, of the feeding channels 28, 29, the compression springs 51, 52 bias the respective spools 53, 54 forward, and the outlets 47, 48 become closed. The inlets 49, 50 open again. The metering head 32 is fixedly secured to the flask 33 with its collar 57.

A second embodiment of the present invention is shown in FIGS. 9–13. Contrary to the first embodiment, in this embodiment, the metering valves 30, 31 are electromagnetically actuated. They are equipped, respectively, with coils 58, 59 for displacing the respective valve spools 60, 61 longitudinally, whereby the respective valve outlets 28, 29 become closed or open. When current flows through the coils 58, 59, the valve spools 60, 61 are displaced into the coils 58, 59. This condition corresponds to a position of the metering head 32 in which it is pressed against the cylindrical wall 2 of the combustion chamber 1. In this position of the metering head 32, a predetermined amount of the fuel gas can be injected into the fore-chamber 21 and the main chamber 22. With no current flow through the spools 58, 59, the springs 62, 63 bias the valve spools 60, 61, respectively, into their initial position. The feeding channels 28, 29 become closed again. Now, the metering chambers 30*a*, 30*b* (See FIG. 8) can again be filled with the liquified fuel gas over the channel 45 (FIG. 8).

Figure 11:
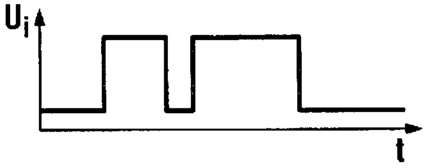
FIG. 11 shows a diagram of an electrical control cycle of the intermittent metering operational mode of the tool shown in FIGS. 9–10.
Figure 12:
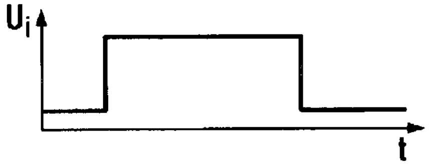
FIG. 12 shows a diagram of an electrical control cycle of the basic operational mode of the tool shown in FIGS. 9–10.

How often an injection process is effected before an ignition process depends from the selected operational mode. With the intermittent metering operational mode, the coils 58, 59 are traversed by current several times, as shown in FIG. 11, which shows the change of the spool voltage $U_i$ in time. With the basic operational mode, the current passes through the coils 58, 59 only once so that the metering valves 30, 31 open only once for injection of the liquified fuel gas before the ignition starts. The basic operational mode is shown in FIG. 12.

Figure 9:
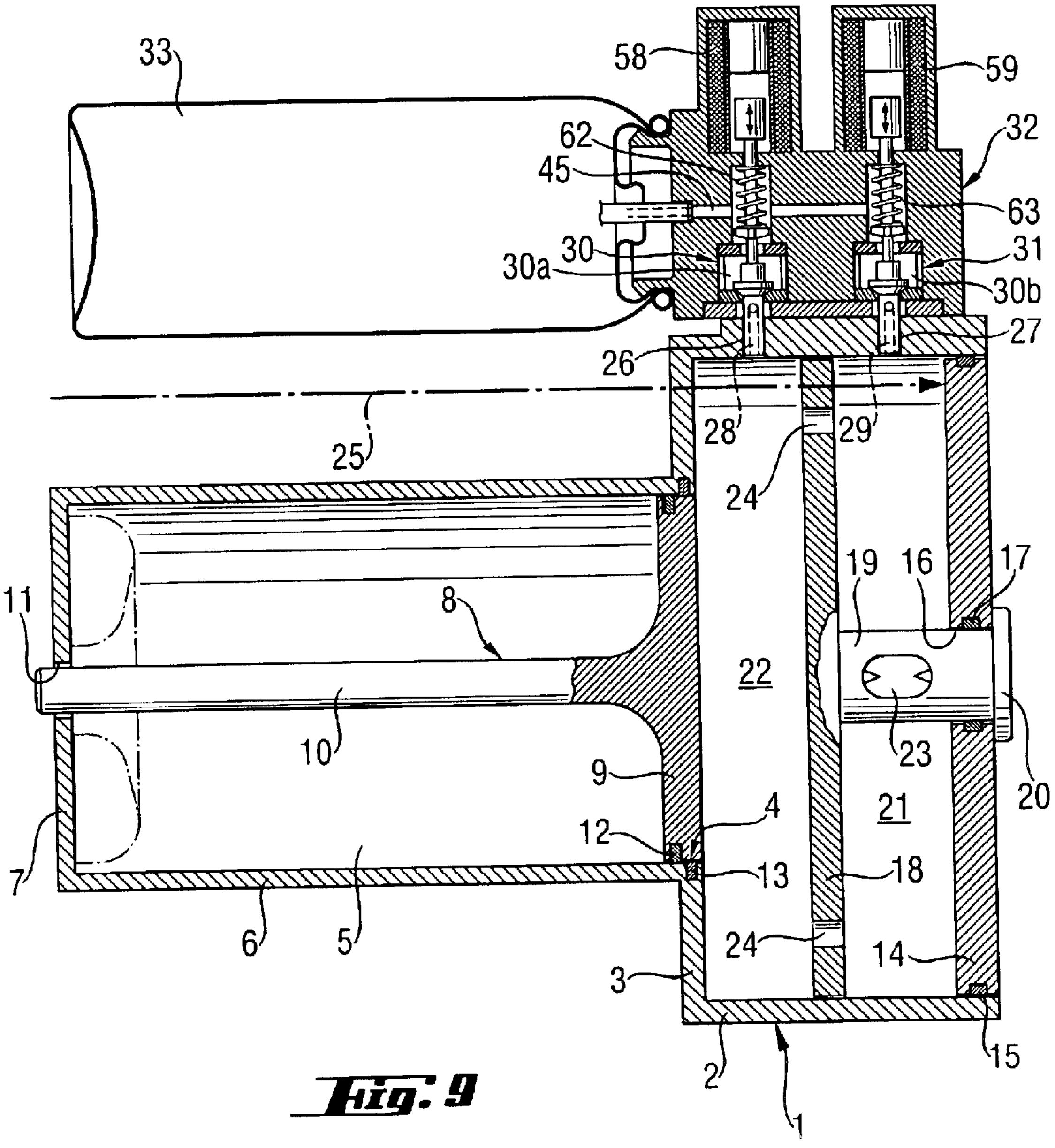
FIG. 9 show a longitudinal cross-sectional view of a portable combustion-engine setting tool according to the present invention with intermittent metering operational mode and with an electromagnetically operated metering valve.
Figure 10:
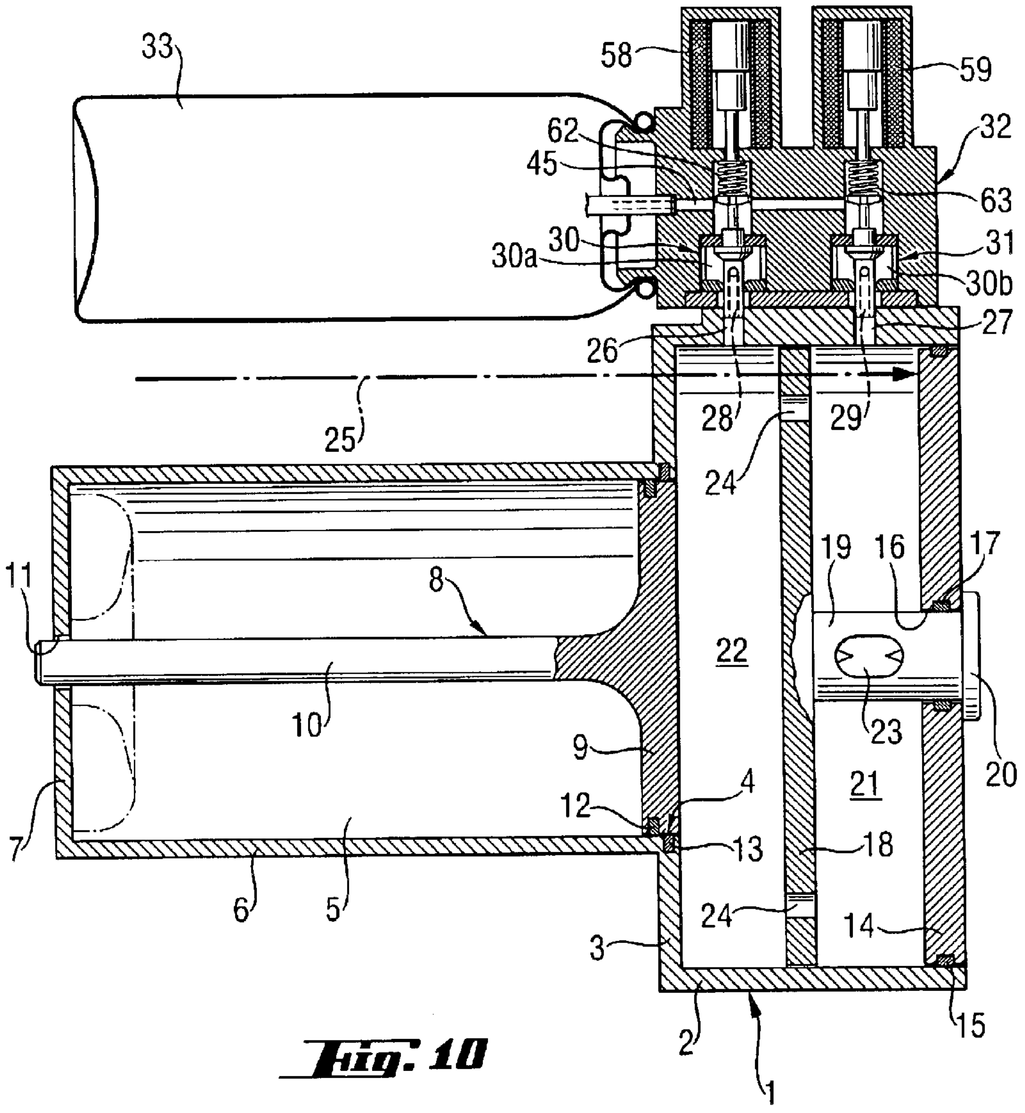
FIG. 10 shows a view similar to that of FIG. 9 but in a different position of the metering head and the metering valve.
Figure 13:
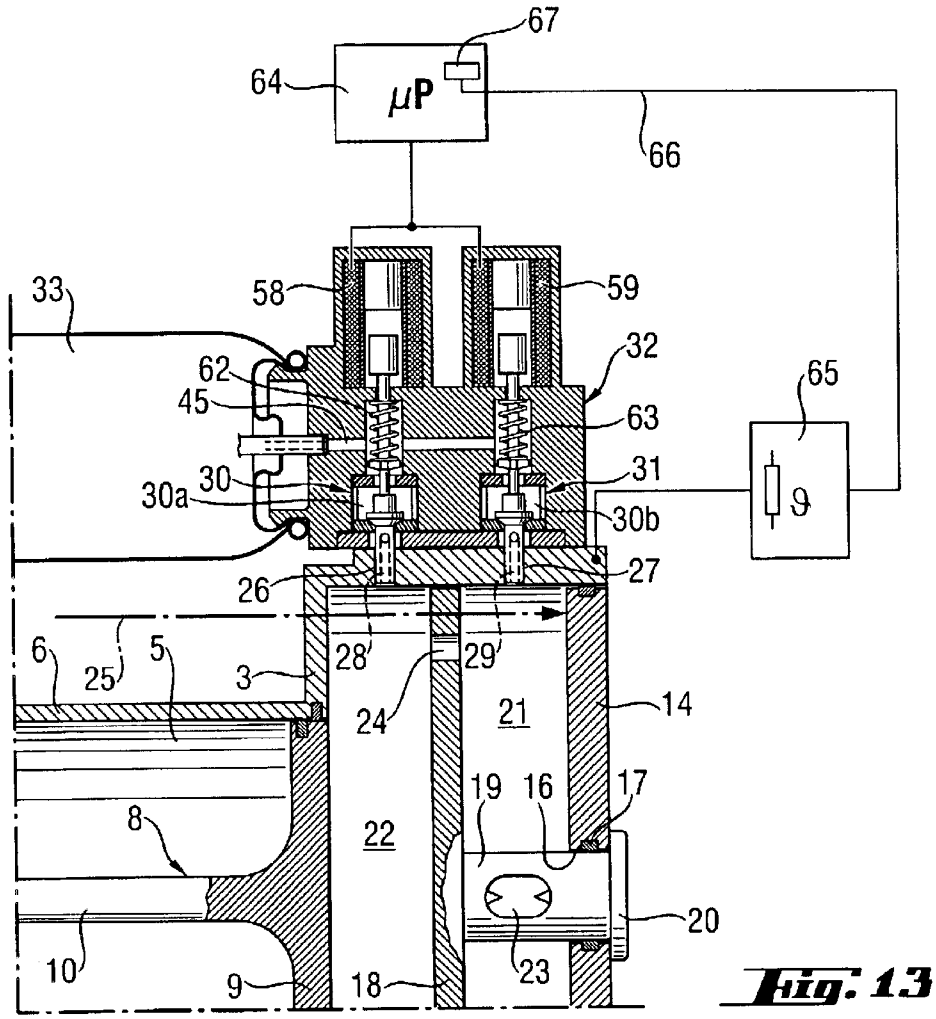
FIG. 13 shows a view similar to that of FIGS. 9–10 illustrating switching between operational modes dependent on sensor signals.

FIG. 13 shows an embodiment in which an operational mode is selected automatically dependent on an operational temperature of the setting tool. In this embodiment again, electromagnetically actuated valves according to FIGS. 9–10 are used. The flow of current through the coils 58, 59 is controlled by a microprocessor 64. The operational temperature of the setting tool is measured with a temperature sensor 65 in the region of the combustion chamber 1 adjacent to the metering valves 30, 31. The temperature sensor 65 communicates its signal through a conductor 66 to a switching device 67 in the microprocessor 64. When the temperature, which is measured by the temperature sensor 65, corresponds to a normal temperature of above 20° C., the switching device is so actuated that microprocessor selects the basic operational mode, so that the liquified fuel gas is fed only once before the start of the ignition process. When the temperature measured by the temperature sensor 65 is much smaller than 20° C., e.g., is close to the freezing point, the switching device 67 actuates the microprocessor 64 so that the intermittent metering operational mode is selected, with feeding of the liquified fuel gas into the fore-chamber 21 and the main chamber 22 several times. Instead of the operational temperature, other or additional parameters can control the selection of the operational mode, e.g., air pressure and the like.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A method of controlling operation of a portable combustion-engined, power tool having a combustion chamber and a piston (8) having an initial position in which it adjoins the combustion chamber, the method comprising the steps of feeding fuel into a combustion chamber of the power tool several times one after another in accordance with an intermittent metering operational mode; mixing the fuel with air in the combustion chamber for obtaining of a combustible air-fuel mixture; and, thereafter, igniting the obtained combustible air-fuel mixture for displacing the piston from the initial position thereof in an operational direction of the power tool; and switching from the intermittent metering operational mode to a basic overational mode with which the fuel is fed into the combustion chamber only once when warranted by at least one of overational parameters and environmental conditions.

2. A method according to claim 1, wherein selection between the intermittent metering operational mode and the basic operational mode is effected manually.

3. A method according to claim 1, wherein selection between the intermittent metering operational mode and the basic operational mode is effected automatically.

4. A method according to claim 1, wherein the feeding of the fuel into the combustion chamber is effected by injection of a liquified fuel gas.

5. A method according to claim 4, wherein the intermittent metering operational mode, a length of each of following one another metering cycles increases in comparison with a previous metering cycle.

6. A method according to claim 1, wherein the combustion chamber has a fore-chamber and a main chamber, and wherein with both the intermittent metering operational mode and the basic operational mode, feeding of fuel in each of the fore-chamber and the main chamber is effected separately.

7. A portable, combustion-engined, power tool, comprising a combustion chamber (1); means (32, 33) for feeding fuel into the combustion chamber (1) to obtain therein a combustible air-fuel mixture; an ignition device (23) for igniting the obtained air-fuel mixture; control means (34, 44) for controlling the operation of the feeding means (32, 33) so that it fees the fuel into the combustion chamber (1) before the ignition several times in accordance with an intermittent metering operational mode; a piston (8) having an initial position, in which it adjoins the combustion chamber (1) and displaceable in an operational direction of the power tool from the initial position thereof upon ignition of the combustible air-fuel mixture in the combustion chamber and a switching device (44, 67) for switching from the intermittent metering operational mode to a basic operational mode and vice versa.

8. A power tool according to claim 7, wherein the switching device (44) is operated manually.

9. A power tool according to claim 7, wherein the switching device (7) is operated automatically dependent on at least one of operational parameters of the power tool and environmental conditions.

10. A power tool according to claim 7, wherein the fuel feeding means (32, 33) comprises at least one metering valve (30, 31) for injecting a metered amount of fuel, which is in form of a liquified fuel gas, into the combustion chamber (1).

11. A power tool according to claim 10, wherein the metering valve (30, 31) forms part of a metering head (32) which is displaced by the control means (34), whereby the metering valve (30, 31) opens or closes.

12. A power tool according to claim 11, wherein the control device (34) comprises cam plate means (38, 39) for displacing the metering head (32).

13. A power tool according to claim 7, further comprising sensor means (65) for generating a control signal dependent on at least one of operational parameters of the power tool and environmental condition, and for communicating the control signal to the switching device (44, 67) for selecting a respective one of the intermittent metering operational mode and the basic operational mode.

14. A power tool according to claim 10, further comprising electromagnetic means (58, 59) for controlling operation of the metering valve (30, 31) and which effect opening and closing of the metering valve (30, 31) in accordance with a control signal (Ui) generated by the control means (64).

15. A portable, combustion-engined, power tool, comprising a combustion chamber (1); means (32, 33) for feeding fuel into the combustion chamber (1) to obtain therein a combustible air-fuel mixture; an ignition device (23) for igniting the obtained air-fuel mixture; control means (34, 44) for controlling the operation of the feeding means (32, 33) so that it fees the fuel into the combustion chamber (1) before the ignition several times in accordance with an intermittent metering operational mode; and a piston (8) adjoining the combustion chamber (1) and displaceable in an operational direction of the power tool upon ignition of the combustible air-fuel mixture in the combustion chamber (1), wherein the fuel feeding means (32), 33) comprises at least one metering valve (30, 31) for injecting a metered amount of fuel, which is in form of a liquified fuel gas, into the combustion chamber (1), wherein the metering valve (30, 31) forms part of a metering head (32) which is displaced by the control means (34), whereby the metering valve (30, 31) opens or closes, wherein the control device (34) comprises cam plate means (38, 39) for displacing the metering head (32), and wherein the cam plate means (38, 39) comprises at least two cam plates (38, 39) of which one plate (38) has only one cam (43) and another plate (39) has a plurality of cams (40, 41).

16. A power tool according to claim 15, wherein the switching means (44) brings, in accordance with a selected operational mode, one of the two cam plates (38, 39) in contact with the metering head (32).

* * * * *